United States Patent [19]

Kohriyama

[11] 4,123,120
[45] Oct. 31, 1978

[54] NOISE REDUCING DEVICE IN UNDERCARRIAGE OF TRACK-TYPE VEHICLE

[75] Inventor: Yoshimasa Kohriyama, Tsukui, Japan

[73] Assignee: Caterpillar Mitsubishi Ltd., Tokyo, Japan

[21] Appl. No.: 827,207

[22] Filed: Aug. 24, 1977

[30] Foreign Application Priority Data

Sep. 13, 1976 [JP] Japan ................. 51-109554

[51] Int. Cl.$^2$ ............................................ B62D 55/20
[52] U.S. Cl. ........................................ 305/41; 305/48
[58] Field of Search ................................. 305/41–43, 305/47–49, 35 R

[56] References Cited

U.S. PATENT DOCUMENTS

| 1,597,389 | 8/1926 | Penn ......................................... 305/47 |
| 4,036,538 | 7/1977 | Haslett et al. ........................... 305/47 |

Primary Examiner—Robert B. Reeves
Assistant Examiner—John P. Shannon
Attorney, Agent, or Firm—James R. Bell

[57] ABSTRACT

Each track shoe in a link-shoe assembly built in a track chain for a track-type vehicle is lined with an elastomer pad. One elastomer pad in one track shoe abuts another adjacent elastomer pad in compression in a manner that when adjacent track links effect a relative pivotal movement, the adjacent elastomer pads are further compressed together and produce an elastic resistance for track links, thereby eliminating a sag in a track chain.

Preferably, each elastomer pad is secured to each track shoe through the medium of a plate spring. The size of the elastomer pad is so selected that adjacent pads are compressed together, when assembled.

Alternatively, adjacent corners of elastomer pads may be rounded so as to provide a smooth contact therebetween, when the adjacent track links effect a relative pivotal movement, or may be covered with extended portions of the plate spring to reduce wear of the elastomer pads.

2 Claims, 7 Drawing Figures

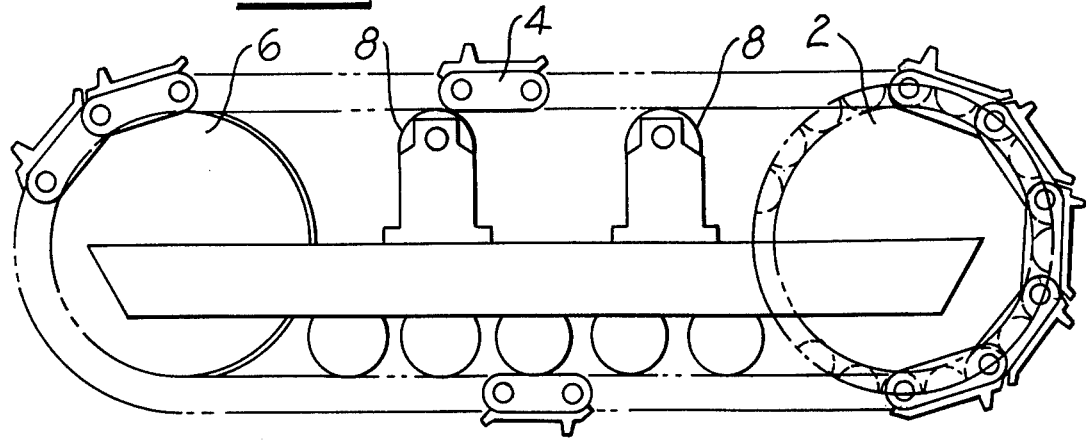
Fig_1_ (PRIOR ART)
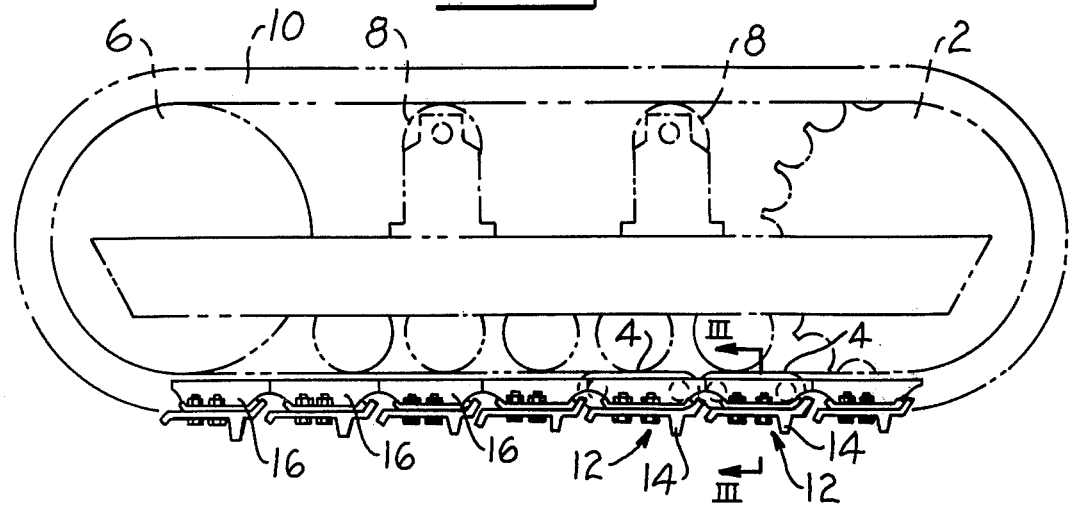
Fig_2_
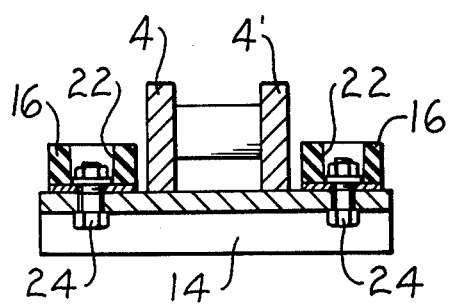
Fig_3_
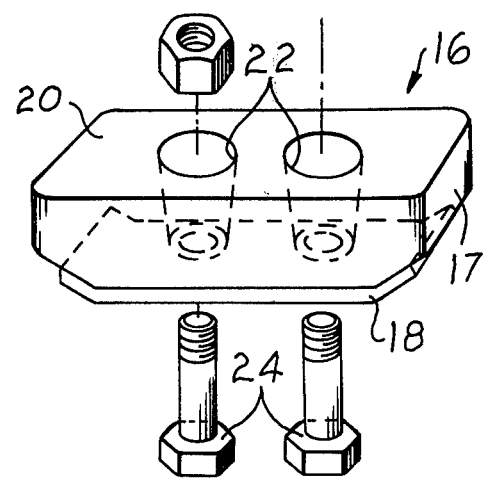
Fig_4_

NOISE REDUCING DEVICE IN UNDERCARRIAGE OF TRACK-TYPE VEHICLE

BACKGROUND OF THE DISCLOSURE

1. Field of the Invention

This invention relates to a noise reducing device for an undercarriage of a track-type vehicle, and more particularly to track shoes in a link shoe assembly thereof.

2. Description of the Prior Art

Noise is produced from the undercarriage of a track-type vehicle equipped with a linked chain of track shoes when the vehicle runs. The major sources for such a noise or metallic impact noise is due to the contact between the teeth of a sprocket and a bushing which couples adjoining track links together; the contact between the rolling surface of an idler and a track link; and the contact between the rolling surface of a carrier roller and a track link.

To avoid this, there have been proposed many attempts, in which for instance, rubber pads are bonded to the side surfaces of a sprocket, flange surfaces of an idler and carrier rollers so as to avoid metal-to-metal contact between these members and a track link. However, an attempt to interpose a rubber pad between two metallic members is not recommendable because of premature wear and damages of rubber pads due to their direct contact with the movable portions of a track link.

In addition, the provision of such rubber pads in the undercarriage of a track-type vehicle results in an increase in a manufacturing cost and a need for modification in a large scale. Furthermore, the attaching and removing operations of rubber pads are attended with considerable difficulties.

In view of the above, it would be advantageous to provide a suitable linked chain of track shoes which avoid the noise and wear problems associated with the prior art.

SUMMARY OF THE INVENTION

The present invention is directed to overcoming one or more of the problems as set forth above.

According to the present invention this is accomplished by providing a noise reducing device for use in an undercarriage of a track-type vehicle, which provides a long service life and high reliability and may be attached, with minimum expenditure of time and efforts as well as ease.

The present invention is based on a discovery that metallic impact noise produced from the undercarriage of a track-type vehicle stems from a sag in a track chain. Thus, the present invention is directed to the prevention of oscillation of a track chain as well as to the smooth engagement or contact between the teeth of a sprocket and bushes, between the rolling surface of an idler and a track link, and between a carrier roller and a track link.

According to the present invention, an elastomer pad is secured to each track shoe in a manner that the adjoining pads thus provided are compressed together, when assembled, thereby eliminating a sag in a track chain.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a view of an outline of an undercarriage of a conventional track-type vehicle;

FIG. 2 is a partial view similar to that of FIG. 1, in which a noise reducing device is built in a track chain;

FIG. 3 is a cross-sectional view taken along the line III—III of FIG. 2;

FIG. 4 is an exploded perspective view of a resilient member, bolts and nuts used in the noise reducing device according to the present invention;

DETAILED DESCRIPTION

Figure 5:
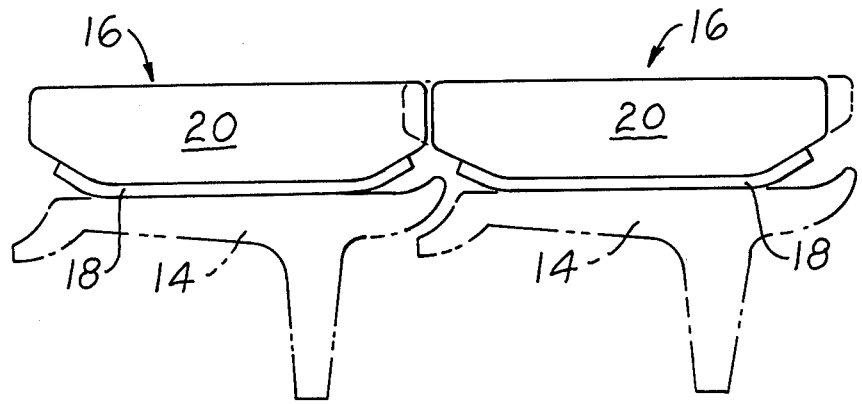
FIG. 5 is a partial view of resilient members which are built into a track chain, with a load applied thereto beforehand.

The noise reducing device according to the present invention will be described in more detail with reference to FIGS. 2 and 3. Shown at 2 is a sprocket, at 6 an idler, at 8 a carrier roller, at 10 a track chain trained around the sprocket, idler and carrier rollers, at 12 a link shoe assembly constituting part of the track chain 10, at 4 a track link, and at 14 a track shoe, the latter two constituting a link shoe assembly. The track shoes 14 in the link shoe assembly 12 are coupled together by means of pins and bushings, thus forming a pivotally linked chain of relatively movable, adjacent track shoes 14.

The noise reducing device according to the present invention consists essentially of a plurality of resilient members 16 secured to the back surfaces of shoes 14 on the opposite sides of track links 4,4', as shown in FIGS. 2 and 3. The resilient member 16, as shown in FIG. 4, consists of a substantially flat plate spring 18 and a cubic elastomer 20 secured to the plate spring 18 according to a baking or bonding technique or the like. As shown, each resilient member is secured to the back surface of a shoe 14 through the medium o the plate spring 18, with a bolt hole 22 thereof in register with a bolt hole in the shoe 14, followed by tightening of bolts and nuts 24. In this manner, resilient members 16 are built in over the entire run of the track chain 10. When assembled, edges 17 of elastomers 20 abut each other in compression, and thus produce an elastic resistance between adjacent shoes. The resistance is enhanced during the relative pivotal movement of links of the track chain 10 due to increased compression of the elastomers. As a result, the track chain 10 may be resiliently supported substantially along a line over a span between the sprocket 2 and the idler 6, and when the track chain 10 goes around the sprocket 2 and idler 6, the size of each elastomer allows the pivotal movement of adjoining links. In this manner, a resilient means such as member 16 is connected to each shoe 14 for biasing each shoe out of contact with its immediately adjacent shoe.

Accordingly, with the noise reducing device of the present invention, the track chain 10 is resiliently supported substantially along a line, thereby eliminating a sag in the track chain 10, or otherwise in an outwardly projecting manner between the sprocket 2 and the idler 6. In addition, in such portions of track chain 10, which engage the sprocket, idler and carrier rollers 8, bushings which couple the track links together, and track links are supported in a manner to be engaged by the teeth of the sprocket as well as by the rolling surfaces of an idler and carrier rollers, so that an oscillatory motion of the track chain may be eliminated to a great degree, and thus there may be achieved smooth engagement or contact between the track chain, and the sprocket, idler and carrier rollers, thereby reducing noise arising from the undercarriage of a track-type vehicle.

Meanwhile, it is preferable that the configuration and size of the elastomer 20 when relaxed should be so selected as to be somewhat larger than when assembled, as shown by a broken line in FIG. 5, so that when assembled in the track chain, the configuration of an elastomer is changed into that shown by a solid line. As a result, this aids in eliminating a sag in the track chain 10, and producing a sufficient reaction between the adjoining elastomers.

Figure 6:
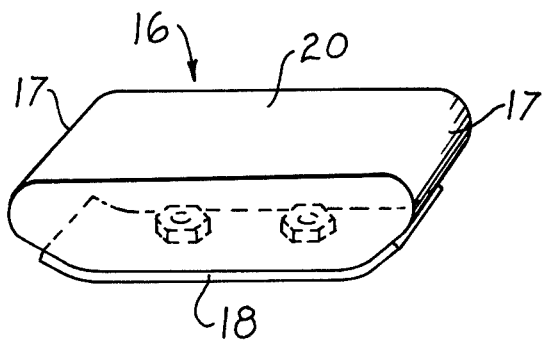
FIGS. 6 and 7 are perspective views showing resilient members which are modifications of the present invention.

FIG. 6 shows another embodiment of the present invention. An abutting edge 17 of the elastomer is rounded, thereby providing smooth pivotal movements of a link shoe assembly, when passing around the sprocket and idler.

Figure 7:
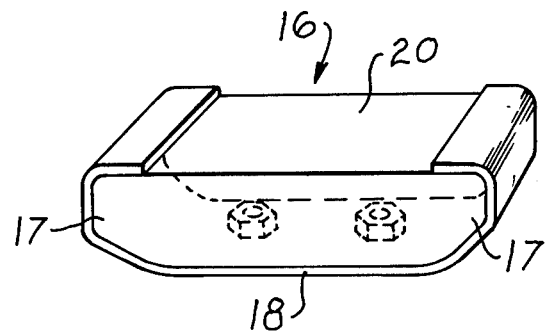

FIG. 7 shows still another embodiment of the invention, in which the elastomer 20 has its contacting portion 17 encompassed with an extension of the plate spring 18 which bears the elastomer thereon, so that wear of the elastomers 20 may be reduced.

Meanwhile, the configuration of each resilient member may be varied, as desired, so as to provide a desired elastic resistance between adjacent resilient members.

As is apparent from the foregoing description of the noise reducing device according to the present invention, rubber pads do not contact movable portions of an undercarriage, and an oscillatory motion of the track chain is prevented, while allowing smooth engagement or contact between a track chain and other components in the undercarriage, thus reducing noise arising therefrom. Accordingly, the noise reducing device of the invention provides a long service life and high reliability. In addition, for practicing the present invention, there is required a simple modification, such as, providing a bolt hole for attaching a resilient member to a track shoe. Still furthermore, each resilient member may be attached to or removed from each track shoe in a link shoe assembly, thus facilitating replacement of resilient members.

Although the present invention has been described with respect to specific details of certain embodiments thereof, it is not intended that such details be limitations upon the scope of the invention except insofar as set forth in the following claims.

The embodiments of the invention in which an exclusive property or privilege is claimed are defined as follows:

1. A noise reducing device in an undercarriage of a track-type vehicle, comprising:
   a pivotally linked chain of relatively movable track shoes;
   resilient means for biasing each shoe out of contact with its immediately adjacent shoe, said means being connected to each shoe and including a plate spring and an elastomer connected to each plate spring, each plate spring encompassing opposite ends of its associated elastomer, and each plate spring being deflected in abutting engagement with an immediately adjacent plate spring.

2. In a resilient noise reducing device for an undercarriage of a track vehicle including a pivotally linked chain of relatively movable adjacent track shoes, the improvement comprising:
   an elastomer having opposite ends;
   an associated plate spring encompassing the opposite ends and being connected to each shoe, each of the plate springs being deflectable by an adjacent plate spring in response to abutting engagement therewith.

* * * * *